United States Patent Office 2,808,429
Patented Oct. 1, 1957

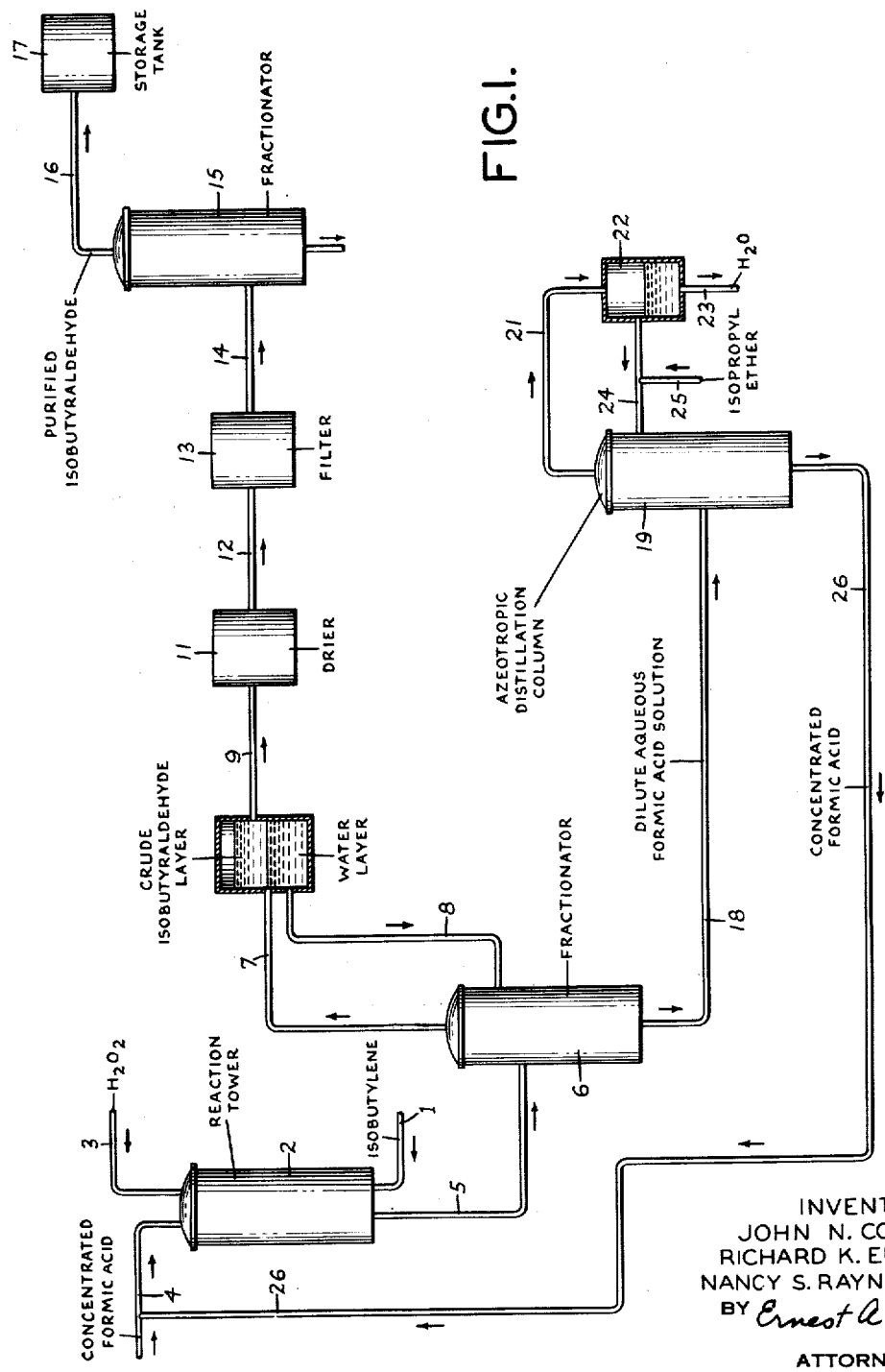

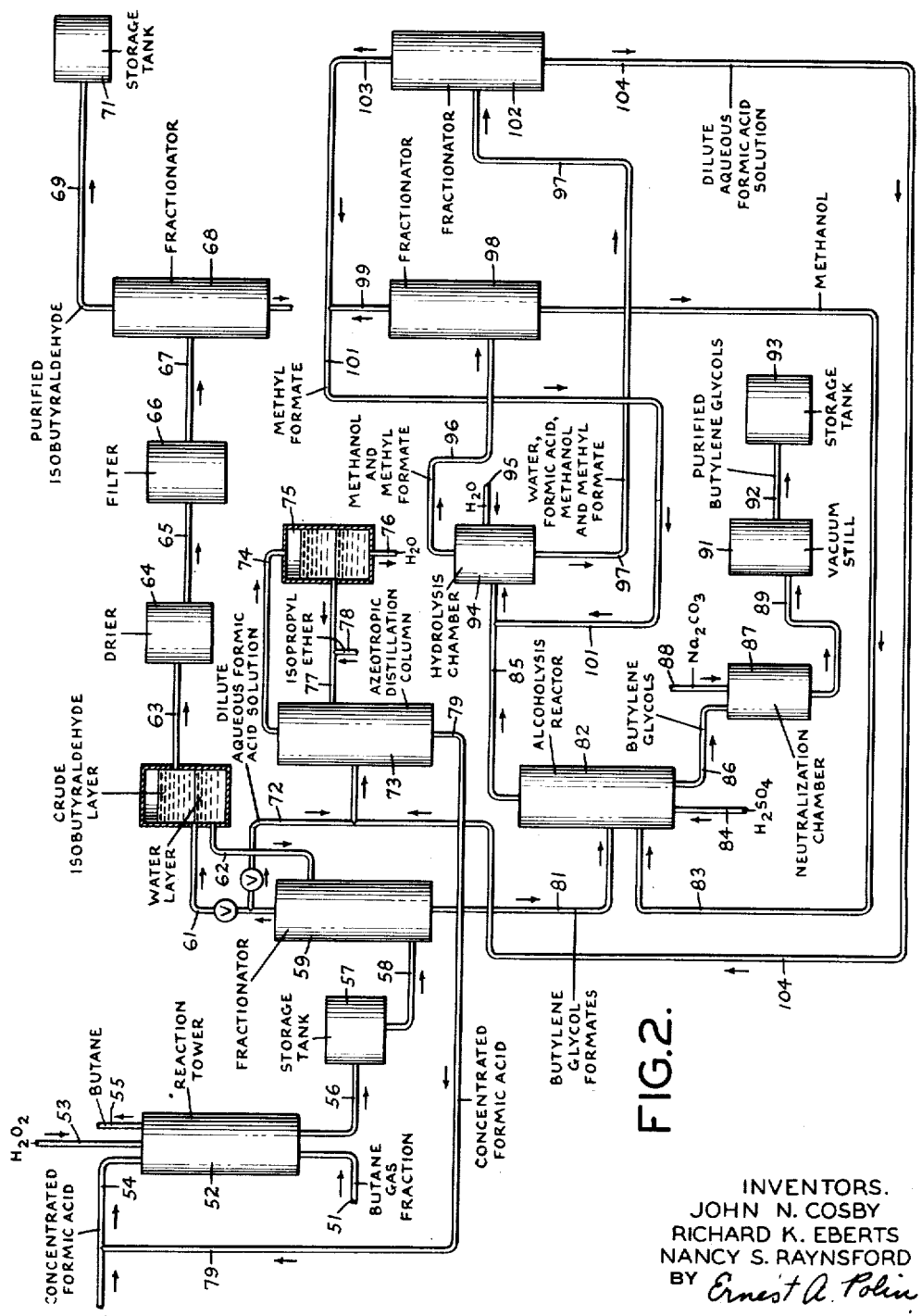

2,808,429

SYNTHESIS OF CARBONYL COMPOUNDS

John N. Cosby, Morris Township, Morris County, Richard K. Eberts, Mendham, and Nancy S. Raynsford, New Providence, N. J., assignors to Allied Chemical & Dye Corporation, New York, N. Y., a corporation of New York Application August 12, 1954, Serial No. 449,346

8 Claims. (Cl. 260—488)

This invention relates to the synthesis of carbonyl compounds such as aldehydes and ketones and more particularly refers to a new and improved process for converting olefinic compounds to carbonyl compounds.

It has been suggested that carbonyl compounds may be produced by oxidation of polyhydroxy organic compounds derived from olefinic compounds. Various laboratory methods are available for the preparation of the polyhydroxy organic compounds from olefinic compounds, such as oxidation with permanganate, chlorates, peracids or by the direct addition of hydrogen peroxide. However, due to low yields, slow reaction time, high cost of reagents or difficulties in product isolation, such processes have found no practical use in large-scale production of polyhydroxy organic compounds. The literature reveals that improved results are obtained if the polyhydroxy organic compounds are produced by reacting olefinic compounds with hydrogen peroxide and formic acid to form an intermediate formate ester compound which is then hydrolyzed to the polyhydroxy organic compound. The polyhydroxy organic compound may then be further oxidized to form a carbonyl compound.

We have now made the surprising discovery that tertiary type olefinic compounds may be directly converted to carbonyl compounds by treatment with hydrogen peroxide and formic acid under conditions as hereinafter specified.

Accordingly, one object of the present invention is to provide an economical and efficient process for directly converting tertiary type olefinic compounds to carbonyl compounds.

Another object of this invention is to provide an economical and efficient process for producing carbonyl compounds directly from tertiary type olefinic compounds by reaction with hydrogen peroxide and formic acid.

A further object of the present invention is to provide a practical and economical process for the treatment of gaseous mixtures containing isobutylene and normal butenes to convert the isobutylene and normal butenes to distinctly different, valuable reaction products.

Still further objects and advantages will be apparent from the following description and drawings.

All percentages hereinafter recited in this specification and appended claims are percentages by weight.

In accordance with the present invention, synthesis of carbonyl compounds is accomplished by admixing a tertiary type olefinic compound, formic acid and hydrogen peroxide, said mixture containing less than 40% water, preferably less than 20% water, reacting the mixture at a temperature below 70° C., preferably at a temperature of 0° to 40° C., and distilling the reaction product to remove a carbonyl compound. If the reaction is carried out in an aqueous solution of greater dilution than called for by the process of the invention, a glycol instead of the desired carbonyl compound tends to be formed, and the reaction rate is substantially reduced.

As will be obvious to those skilled in the art, the process of this invention can be carried out by continuous as well as batch operation.

The tertiary type olefinic compound employed as reactant in the instant process is illustrated by the formula:

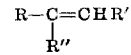

where R and R" are organic radicals and R' is a member of the group consisting of hydrogen and organic radicals. Preferred organic radicals in the above formula are alkyl and aryl.

Representative tertiary type olefinic compounds are isobutylent, isoprene, α-methylstyrene, β-methallyl alcohol, di-isobutylene-1, di-isobutylene-2, 2-methylbutene-1 and 2-methylbutene-2.

One specific embodiment of the present invention is concerned with the treatment of gaseous mixtures containing isobutylene and normal butenes (by normal butenes we mean butene-1 and butene-2) to convert the isobutylene and normal butenes selectively and simultaneously into distinctly different, valuable reaction products. For example, a gas fraction containing butane, butene-1, butene-2 and isobutylene, such as is obtained from the cracking of petroleum gases or liquid fractions, is admixed with hydrogen peroxide and formic acid, said mixture containing less than 40% water, preferably less than 20% water; the mixture is reacted at a temperature below 70° C., preferably at a temperature between 0° and 40° C.; the reaction product is distilled at pressure at least approximately atmospheric to remove successive fractions containing isobutyraldehyde and dilute aqueous formic acid solution; the distillate bottoms containing 1,2- and 2,3-butylene glycol formates are admixed with methyl alcohol and a small amount of acid to effect alcoholysis of the butylene glycol formates to 1,2- and 2,3-butylene glycols and methyl formate, and the butylene glycols are separated from the methyl formate. The isobutyraldehyde and butylene glycols prepared by this simple and economical procedure are useful as valuable chemical intermediates in organic synthesis.

When the tertiary type olefinic compound treated is isobutylene, as in the above procedure, distillation of the reaction product is desirably at pressure at least approximately atmospheric since distillation at appreciably reduced pressure has been found to yield insignificant amounts of isobutyraldehyde.

The main reaction products, obtained by the treatment of tertiary type olefins in the process of the invention are carbonyl compounds which may be saturated or unsaturated. If the treated tertiary type olefinic compound is mono-unsaturated, the carbonyl product is saturated; however, if the treated compound is di-unsaturated, the carbonyl product is unsaturated. Generally, these carbonyl compounds are very useful as intermediates in preparation of other organic compounds of commercial importance.

When the tertiary type olefinic compound is a gas, such as isobutylene, the process may be carried out by introducing the gas into the bottom of a bubble plate or packed tower and bubbling the gas through a mixture of hydrogen peroxide and formic acid introduced into the tower. A preferred way of operating, however, is to add the hydrogen peroxide continuously at a rate equivalent to the rate of addition of the olefinic compound, whether operating batch-wise or continuously with respect to the formic acid. When the tertiary type olefinic compound is a liquid, it has been found desirable to employ an ordinary closed kettle type reactor provided with stirring and temperature control means and a reflux condenser whereby vaporized materials are returned to the reaction zone.

Figure 1 is a diagrammatic flow sheet illustrating one embodiment of the invention.

Figure 2 is a diagrammatic flow sheet illustrating still another embodiment of the invention.

Referring to Figure 1, isobutylene, introduced through line 1 into the bottom of reaction tower 2, is bubbled through a mixture of hydrogen peroxide and formic acid, introduced into tower 2 through lines 3 and 4, respectively. The tower may suitably be a flooded type tower with baffles, a bubble plate tower or a packed tower. Hydrogen peroxide of a concentration of about 20 to 50% is preferably employed, higher concentrations being uneconomical. The formic acid serves as a reagent, as a solvent, as a diluent and as a heat-removing agent. Formic acid of a high concentration, preferably at least about 90%, should be employed because with dilute formic acid an unduly long time is required to complete the reaction. In order to effect substantial conversion of the isobutylene to isobutyraldehyde as well as to attain minimum reaction time, it was found necessary to limit the amount of water in the reaction tower to less than 40%, preferably less than 20%, of the total reaction mixture.

The reaction in tower 2 is exothermic, as a result of which the temperature of the mixture rises. The temperature is maintained below 70° C., and is preferably kept within the range of 0° to 40° C. Temperature of the reaction is controlled by means of indirect cooling, as for example, a water jacket, not shown in the drawing. Temperatures in excess of 70° C. have been found to cause decomposition of the hydrogen peroxide and formation of unwanted by-products.

We have found that by employing the conditions of the present invention the actual reaction time, i. e. the time required for an average molecule of the olefinic compound to react with an average molecule of hydrogen peroxide or performic acid, is practically instantaneous. The completion of the reaction is indicated by the diminution of evolution of heat, or more definitely, by testing a small sample of the mixture for the purpose of ascertaining that the hydrogen peroxide has been consumed. In a vessel designed for continuous operation the critical time would be the residence time, i. e. the time required for a given volume of the formic acid solution to move into and out of the vessel in such a way that it contained the maximum concentration of reaction product and the minimum concentration of unreacted olefinic compound or hydrogen peroxide. Such residence time may vary within wide limits, depending upon the engineering design.

The operation in reaction tower 2 may be conveniently carried out at atmospheric pressure; superatmospheric pressure is not necessary. In the operation of the process we have found it necessary to hold the concentration of the hydrogen peroxide in the mixture below about 6% for the reason that hydrogen peroxide of higher concentrations in the presence of formic acid decomposes and could produce a minor explosion.

After completion of the reaction, the reaction product is withdrawn from reaction tower 2 through line 5 and is introduced into fractionator 6 which may be any conventional fractionating column equipped with the usual bubble-cap trays and steam coil for supplying heat at the bottom of the column. The reaction product is distilled at atmospheric pressure in fractionator 6. From the top of the fractionator is removed through line 7 a cut boiling at about 55° to 60° C. which separates into two layers, an upper oil layer comprising crude isobutyraldehyde and a lower water layer. The water layer is returned to fractionator 6 through line 8 and is again distilled. Alternatively, a portion of the water layer may be returned to fractionator 6 as reflux and the remainder may be passed first to a stripping vessel (not shown) where dissolved isobutyraldehyde is distilled off, then discharged as waste. The crude isobutyraldehyde is passed through line 9 into drier 11 which contains any suitable solid drying agent such as "Drierite" (a commercial anhydrous calcium sulfate drying agent) or anhydrous sodium sulfate. The dehydrated product is then passed via line 12 to filter 13 where solid particles are removed by means of any conventional filtration process. The filtered product then passes through line 14 to fractionator 15 where the product is distilled at atmospheric pressure. Substantially pure isobutyraldehyde distills over at about 60° to 63° C. through line 16 and is collected in storage tank 17. Isobutyraldehyde has been found particularly valuable in producing its corresponding oxime, a valuable anti-skinning agent for paint.

Dilute aqueous formic acid solution constituting the bottoms of fractionator 6 is directed through line 18 into azeotropic distillation column 19 which may be a tower containing a series of bubble-cap plates and a heat exchanger at the bottom of the tower for supplying heat for carrying out the distillation. The primary function of column 19 is to dehydrate the dilute formic acid to produce a concentrated acid which is recycled for further reaction with isobutylene and hydrogen peroxide. Although several azeotropic agents such an n-propyl formate, n-propyl ether and allyl ether have been found satisfactory for effecting dehydration of the formic acid, we have found that isopropyl ether accomplishes more efficient and sharper separation of the water from the formic acid than the other azeotropic agents and, therefore, is our preferred entrainer. Vapors of water and isopropyl ether are released from the top of the column 19 through line 21, condensed, and the condensate collected in receiver 22 wherein it separates into two layers,, a lower layer of water discharged from the separator through line 23 and an upper layer of isopropyl ether returned via line 24 to the top of column 19 for further azeotropic distillation therein. Small amounts of isopropyl ether are added as make-up ether from an external source through line 25. Dehydrated formic acid as bottoms having a concentration of at least about 90% formic acid is returned to reaction tower 3 via lines 26 and 4.

Referring to Figure 2, a gas fraction obtained from cracking of low-boiling petroleum products and containing butane, isobutylene, butene-1 and butene-2, having been introduced through line 51 into the bottom of reaction tower 52, bubbled through a mixture of formic acid of a high concentration, preferably at least about 90%, and hydrogen peroxide of a preferred concentration of about 20 to 50%. The formic acid and hydrogen peroxide are introduced to the tower through lines 53 and 54, respectively. The amount of water present in the reaction mixture is limited to less than 40%, preferably less than 20%, in order to attain minimum reaction time to complete the reaction and to effect selective conversion of the normal butenes and isobutylene to formate and carbonyl compounds, respectively.

The temperature in tower 52 is maintained below 70° C., preferably within the range of 0° to 40° C., by means of indirect cooling, as for example, a water jacket or coil, not shown in the drawing. The operation in reaction tower 52 may be conventionally carried out at atmospheric pressure. The concentration of hydrogen peroxide in the mixture is maintained below about 6% to avoid decomposition of the hydrogen peroxide and the possibility of formation of an explosive mixture.

The resulting reaction is practically instantaneous. Butane is unchanged by the reaction and passes out of reaction tower 52 through line 55 and may be collected in any convenient manner. The reaction product is withdrawn from reaction tower 52 through line 56 into intermediate product storage tank 57. From storage tank 57 the reaction product passes through line 58 to fractionator 59 which may be any conventional fractionating column. The reaction product is distilled at atmospheric pressure in fractionator 59. From the top of the fractionator is removed through valved line 61 a cut boiling at about 55° to 60° C. which separates into two layers, an upper layer comprising crude isobutyraldehyde and a lower water layer. The water layer is returned to fractionator 59 through line 62 and is again distilled. The crude isobutyraldehyde is passed through line 63 into drier 64 which contains any suitable solid anhydrous drying agent. The dehydrated crude isobutyraldehyde is then passed through line 65 to filter 66 where solid particles are removed by means of any conventional filtration procedure. The filtered crude product then passes through line 67 to fractionator 68 where the product is distilled at atmospheric pressure. Substantially pure isobutyraldehyde distills over at about 60° to 63° C. through line 69 and is collected in storage tank 71.

From the top of fractionator 59 is removed through valved lines 61 and 72 a second cut boiling at about 98° to 108° C. and comprising dilute aqueous formic acid solution. The formic acid solution passes through line 72 into azeotropic distillation column 73 which may be a tower containing a series of bubble-cap plates and a heat exchanger at the bottom of the tower for supplying heat for carrying out the distillation. Any suitable azeotropic agent effecting the dehydration of formic acid may be used; however, we prefer to employ isopropyl ether. Vapors of water and isopropyl ether are released from the top of column 73 through line 74, condensed, and the condensate collected in receiver 75 wherein it separates into 2 layers, a lower layer of water discharged from the separator through line 76 and an upper layer of isopropyl ether returned via line 7 to the top of column 73 for further azeotropic distillation therein. Small amounts of isopropyl ether are added as make-up ether from an external source through line 78. Dehydrated formic acid as bottoms having a concentration of at least about 90% formic acid is returned to reaction tower 52 via lines 79 and 54.

The bottoms containing 1,2- and 2,3- butylene glycol monoformates and to a lesser extent 1,2- and 2,3- butylene glycol diformates from fractionator 59 are directed via line 81 to alcoholysis reactor 82 which may be a tower having plates in its upper portion to aid in the separation of methyl formate and water from the butylene glycols produced by alcoholysis of the butylene glycol formates. To the butylene glycol formates in reactor 82 methyl alcohol is added through line 83 in an amount at least equal in ester equivalent to the butylene glycol formates. A small amount of concentrated sulfuric acid, about 0.1% of the mixture of butylene glycol formates and methanol, is added through line 84 to the mixture in reactor 82. The mixture in reactor 82 is then heated by means of a steam coil, not shown in the drawing, to effect alcoholysis of the butylene glycol formates and simultaneous vaporization of the methyl formate produced by the reaction. The first vapor fraction removed from reactor 82 through line 85 is substantially pure methyl formate. The subsequent vapor fractions released through line 85 contain methyl formate, excess methanol and water. The residue remaining in alcoholysis reactor 82 contains 1,2- and 2,3- butylene glycols, together with a small amount of sulfuric acid catalyst. A sample of the reaction products in chamber 82 may be removed and titrated to determine when alcoholysis is substantially complete.

The residue from reactor 82 is directed through line 86 into neutralization chamber 87 which may be simply an empty vessel into which a suitable base such as sodium carbonate or sodium hydroxide in an amount sufficient to neutralize the acid constituents is introduced through line 88 and the mixture therein agitated. The neutralized butylene glycols are withdrawn from chamber 87 through line 89 and subjected to distillation in a conventional vacuum still 91. Substantially pure butylene glycols are forwarded from still 91 through line 92 to storage tank 93.

Methyl formate vapors, together with some water vapor generated in alcoholysis reactor 82, are transferred through line 85 to hydrolysis chamber 94 which desirably has a series of spaced plates in its upper portion and a heating coil immersed in the body of liquid in the bottom of the chamber. Methyl formate, when heated to a temperature between 75° to 150° C., preferably 100° to 105° C., in hydrolysis chamber 94, rapidly hydrolyzes to methanol and formic acid. At the higher temperatures it is desirable to maintain superatmospheric pressure in chamber 94 to control vaporization of the methyl formate. The hydrolysis of methyl formate is accomplished by the addition of water through line 95 to the methyl formate undergoing hydrolysis in chamber 94. As the methyl formate hydrolyzes, the resultant methanol, which carries with it some methyl formate, is vaporized from the top of chamber 94 through line 96, leaving as bottoms a mixture of formic acid and water, together with a small amount of methyl formate and methanol which is withdrawn through line 97. Addition of a trace of $H_2SO_4$ or other acid as a catalyst to the methyl formate in hydrolysis chamber 94 accelerates the hydrolysis reaction. The mixture of methanol and methyl formate passing through line 96 is subjected to fractionation in conventional fractionator 98 wherein the methyl formate is separated from the mixture and returned via lines 99, 101 and 85 to chamber 94 for further hydrolysis reaction. The methanol bottoms from fractionator 98 are withdrawn through line 83 and returned to alcoholysis reactor 82 for further reaction with butylene glycol formates.

The mixture of formic acid, methanol, methyl formate and water drawn off from the bottom of hydrolysis chamber 94 is set through line 97 to conventional fractionator 102 wherein methyl formate and methanol are separated from the mixture and returned through lines 103, 101 and 85 to hydrolysis chamber 94. The bottoms in fractionator 102, a dilute aqueous solution of formic acid, are sent through lines 104 and 72 to azeotropic distillation column 73 wherein it is concentrated to at least about 90% formic acid and then recycled to reaction tower 52.

Although not shown in the drawings, the usual conventional auxiliary equipment common in industry such as coolers, condensers, temperature controls for regulating the temperature at the top of towers, surge tanks and pumps are employed for facilitating the operation of the process.

The following examples wherein parts are by weight illustrate several methods of carrying out the invention.

*Example 1.*—A charge of 800 parts of 90% formic acid and 50 parts of 50% hydrogen peroxide is placed in a glass tower cooled with a water jacket. Isobutylene is bubbled through the solution from the bottom of the tower. The reaction is exothermic, and the temperature is maintained at 21° to 40° C. by the cooling jacket. When an equivalent amount of isobutylene has been absorbed, 50 parts of 50% hydrogen peroxide are added and the isobutylene input resumed. This procedure is repeated until 382 parts of isobutylene have been absorbed and a total of 500 parts of 50% hydrogen peroxide has been charged. Periodically a portion of the reaction mixture is drained from the tower to provide space for addition of hydrogen peroxide solution. The product mixture constituting 1682 parts, of which 330 parts, or about 19.6%, is water, is distilled at atmospheric pressure. A large cut boiling at 55° to 60° C. is obtained which separates into two layers, a lower aqueous layer and an upper oil layer. The aqueous layer is returned to the still and again distilled. The total oil layer constitutes 368 parts of crude isobutyraldehyde nearly all boiling at 60° C. as a water azeotrope.

The crude isobutyraldehyde is dried with anhydrous sodium sulfate, then with "Drierite" (a commercial anhydrous calcium sulfate drying agent), filtered and distilled at atmospheric pressure. The main fraction boils at 60° to 63° C. and constitutes 331 parts of purified isobutyraldehyde. This represents a 75% yield based on the isobutylene absorbed.

*Example 2.*—A charge of 800 parts of 90% formic acid and 50 parts of 50% hydrogen peroxide is placed in a glass tower cooled with a water jacket. A gas fraction containing 10 parts of butane, 20 parts of isobutylene, 20 parts of butene-1 and 30 parts of butene-2 is bubbled through the solution from the bottom of the tower. The temperature is maintained at 30° to 40° C. by the cooling jacket. When about 38 parts of the butenes have been absorbed, 50 parts of 50% hydrogen peroxide are added and the input of the gas fraction resumed. Unabsorbed butane passes out the top of the column and is collected in any convenient manner. The absorption procedure is repeated until 380 parts of the butenes have been absorbed and a total of 500 parts of 50% hydrogen peroxide has been charged. The product mixture constituting 1680 parts, of which 330 parts, or about 19.6%, is water, is distilled at atmospheric pressure to remove successive fractions of crude isobutyraldehyde boiling at 55° to 60° C. and aqueous formic acid solution boiling at 98° to 108° C. The crude isobutyraldehyde fraction is treated as in Example 1 to obtain substantially pure isobutyraldehyde. The bottoms of the distillation containing 1,2- and 2,3-butylene glycol formates are admixed with methyl alcohol and a small amount of 66° Bé. sulfuric acid, and the mixture heated in a distillation column with a reflux to distill methyl formate formed as a result of the reaction. Sodium carbonate is added to the distillation bottoms to neutralize the small amount of acid therein and the neutralized bottoms heated to distill off excess methanol. The bottoms containing 1,2- and 2,3-butylene glycols are then distilled under vacuum to produce substantially pure 1,2- and 2,3-butylene glycols.

*Example 3.*—39 parts of isoprene are added slowly to 40 parts of 50% hydrogen peroxide in 400 parts of 90% formic acid in a flask equipped with a stirrer, thermometer and condenser. The temperature is maintained at below 40° C. with a water bath. A second batch of 39 parts of isoprene and 40 parts of 50% hydrogen eproxide is then added. The reaction mixture contains about 14.3% water. The reaction product is diluted with water, and an oil fraction constituting 54 parts is steam-distilled out. The oil is washed with aqueous sodium carbonate solution, dried over anhydrous sodium sulfate and distilled at atmospheric pressure. The main cut boils at 116° to 118° C. and constitutes 60 parts of tiglic adehyde. This represents a yield of 31% based on the isoprene charged.

*Example 4.*—80 parts of 2-methylbutene-1 in 400 parts of 90% formic acid and 80 parts of 50% hydrogen peroxide are reacted in the flask employed in Example 3, temperature being held below 36° C. with a water bath. The reaction mixture contains about 14.3% water. The reaction product is diluted with water, and 81 parts of oil are steam-distilled out. The oil is washed with aqueous sodium carbonate solution, then with water, dried over anhydrous sodium sulfate, filtered and distilled at atmospheric pressure. A cut of 42 parts, boiling mostly at 92° C., is 2-methylbutyraldehyde. The yield of the final product is 43%, based on the 2-methylbutene-1 charged.

*Example 5.*—1.14 mols of 2-methylbutene-2 and 1.18 mols of 50% hydrogen peroxide are reacted in 400 parts of 90% formic acid in the flask employed in Example 3, temperature being held below 35° C. The reaction mixture contains about 14.3% water. The reaction product is steam distilled to obtain 77 parts of an oil. This oil is dried and redistilled giving a cut of 49 parts boiling mostly at 49° C. which is methylisopropylketone. The yield of final ketone is 50%, based on 2-methylbutene-2 charged.

In a similar manner by the process of the invention, the following conversions to the indicated products are effected: di-isobutylene-1 to methylneopentyl acetaldehyde, α-methylstyrene to α-phenylpropionaldehyde and β-methallyl alcohol to methacrolein.

Although certain preferred embodiments of the invention have been disclosed for purpose of illustration, it will be evident that various changes and modifications may be made therein without departing from the scope and spirit of the invention.

We claim:

1. A process for the production of isobutyraldehyde which comprises admixing hydrogen peroxide, formic acid and isobutylene, said mixture containing not more than about 7% hydrogen peroxide and less than 40% water, reacting the mixture at a temperature below 70° C., and distilling the reaction product at present at least approximately atmospheric to remove isobutyraldehyde.

2. A process for the production of isobutyraldyde which comprises admixing hydrogen peroxide, formic acid and isobutylene, said mixture containing not more than about 7% hydrogen peroxide and less than 20% water, reacting the mixture at a temperature between 0° to 40° C., and distilling the reaction product at pressure at least approximately atmospheric to remove isobutyraldehyde.

3. A process for the production of substantially pure isobutyraldehyde which comprises admixing hydrogen peroxide, at least about 90% formic acid and isobutylene, said mixture containing not more than about 7% hydrogen peroxide and less than 20% water, reacting the mixture at a temperature between 0° and 40° C., distilling the reaction product at pressure at least approximately atmospheric to remove crude isobutyraldehyde, dehydrating the crude product, filtering the dehydrated product, and distilling substantially pure isobutyraldehyde from the filtrate.

4. A process for the production of substantially pure isobutyraldehyde which comprises admixing hydrogen peroxide, formic acid of a concentration of at least about 90% and isobutylene, said mixture containing not more than about 7% hydrogen peroxide and less than 20% water, reacting the mixture at a temperature between 0° and 40° C., distilling the reaction product at pressure at least approximately atmospheric to remove crude isobutyraldehyde, dehydrating the crude product, filtering the dehydrated product, distilling substantially pure isobutyraldehyde from the filtrate, dehydrating the bottoms containing dilute aqueous formic acid solution from the first-named distillation, and returning the thus concentrated formic acid for further reaction with additional isobutylene and hydrogen peroxide.

5. A process for the treatment of gases containing normal butene and isobutylene which comprises admixing hydrogen peroxide, formic acid and the gas to be treated, said mixture containing not more than about 7% hydrogen peroxide and less than 40% water, reacting the mixture at a temperature below 70° C., distilling the reaction product at pressure at least approximately atmospheric to remove successive fractions of isobutyraldchyde and dilute aqueous formic acid solution, admixing methyl alcohol with the distillate bottoms containing butylene glycol formates, heating the mixture to produce butylene glycol and methyl formate, and separating the butylene glycol from the methyl formate.

6. A proces for the treatment of gases containing normal butene and isobutylene which comprises admixing hydrogen peroxide, formic acid and the gas to be treated, said mixture containing not more than about 7% hydrogen peroxide and less than 20% water, reacting the mixture at a temperature between 0° to 40° C., distilling the reaction product at pressure at least approximately atmospheric to remove successive fractions of isobutyraldehyde and dilute aqueous formic acid solution, admixing methyl alcohol and a small amount of acid with the distillate bottoms containing butylene glycol formates, heating the mixture to produce butylene glycol and methyl formate, and separating the butylene glycol from the methyl formate.

7. A process for the treatment of gases containing butene-1, butene-2 and isobutylene which comprises admixing hydrogen peroxide, formic acid and the gas to be treated, said mixture containing not more than about 7% hydrogen peroxide and less than 20% water, reacting the mixture at a temperature between 0° to 40° C., distilling the reaction product at pressure at least approximately atmospheric to remove successive fractions of isobutyraldehyde and dilute aqueous formic acid solution, admixing methyl alcohol and a small amount of acid with the distillate bottoms containing 1,2- and 2,3-butylene glycol formates, heating the mixture to produce 1,2- and 2,3-butylene glycols and methyl formate, and separating the 1,2- and 2,3-butylene glycols from the methyl formate.

8. A process for the treatment of gases containing butene-1, butene-2 and isobutylene which comprises admixing hydrogen peroxide, formic acid of a concentration of at least about 90% and the gas to be treated, said mixture containing not more than about 7% hydrogen peroxide and less than 20% water, reacting the mixture at a temperature between 0° and 40° C., distilling the reaction product at approximately atmospheric pressure to remove successive fractions of crude isobutyraldehyde and dilute aqueous formic acid solution, dehydrating the crude isobutyraldehyde, filtering the dehydrated product, distilling substantially pure isobutyraldehyde from the filtrate, admixing methyl alcohol and a small amount of acid with the distillate bottoms of the first-named distillation, said bottoms containing 1,2- and 2,3-butylene glycol formates, heating the mixture to produce 1,2- and 2,3-butylene glycols and methyl formate, and separating the 1,2- and 2,3-butylene glycols from the methyl formate.

References Cited in the file of this patent

UNITED STATES PATENTS

| | | |
|---|---|---|
| 2,413,889 | Rehberg et al. | Jan. 7, 1947 |
| 2,492,201 | Swern et al. | Dec. 27, 1949 |
| 2,500,599 | Bergsteinsson et al. | Mar. 14, 1950 |

OTHER REFERENCES

Swern: Chem. Reviews 45 (1948), 1–68.

Byers et al.: J. Chem. Soc. (1948), pp. 284–8 (London).

UNITED STATES PATENT OFFICE

CERTIFICATE OF CORRECTION

Patent No. 2,808,429                                      October 1, 1957

John N. Cosby et al.

It is hereby certified that error appears in the printed specification of the above numbered patent requiring correction and that the said Letters Patent should read as corrected below.

Column 2, line 11, for "butylent" read -- butylene --; column 4, line 40, before "bubbled" insert -- is --; column 5, line 25, for "line 7" read -- line 77 --; column 6, line 25, for "set" read -- sent --; column 7, line 32, for "eproxide" read -- peroxide --; column 8, line 5, for "present" read -- pressure --; column 8, line 53, for "proces" read -- process --.

Signed and sealed this 31st day of December 1957.

(SEAL)

Attest:

KARL H. AXLINE
Attesting Officer

ROBERT C. WATSON
Commissioner of Patents